(12) United States Patent
Hawkins et al.

(10) Patent No.: US 9,002,606 B1
(45) Date of Patent: Apr. 7, 2015

(54) SYSTEM AND METHOD FOR CONTROLLING A DRY DUAL CLUTCH TRANSMISSION OF A VEHICLE

(71) Applicant: GM Global Technology Operations LLC, Detroit, MI (US)

(72) Inventors: Craig J. Hawkins, Howell, MI (US); Colin Hultengren, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 14/034,622

(22) Filed: Sep. 24, 2013

(51) Int. Cl.
*B60W 10/02* (2006.01)
*B60W 10/06* (2006.01)
*B60W 10/18* (2012.01)
*F16D 21/00* (2006.01)

(52) U.S. Cl.
CPC ............... *F16D 21/00* (2013.01); *B60W 10/02* (2013.01); *B60W 10/06* (2013.01)

(58) Field of Classification Search
USPC .............. 701/67, 68; 477/167, 172, 173, 174, 477/180; 192/109 F
See application file for complete search history.

(56) References Cited

U.S. PATENT DOCUMENTS

| 8,116,957 B2 * | 2/2012 | Oh et al. ...................... 701/67 |
| 8,538,643 B1 * | 9/2013 | Wang et al. .................. 701/53 |
| 8,849,530 B2 * | 9/2014 | Thor ............................. 701/67 |
| 2014/0195129 A1 * | 7/2014 | Hultengren et al. ........... 701/54 |

* cited by examiner

*Primary Examiner* — Edwin A Young
(74) *Attorney, Agent, or Firm* — Quinn Law Group, PLLC (57) ABSTRACT

A system and method can control the dry dual clutch transmission (dDCT) of a vehicle. The method includes modifying a recorded torque-to-position (TTP) table based on a calculated clutch torque difference between a calculated clutch torque and a commanded clutch torque. The commanded clutch torque is provided by a transmission control module and is defined as a clutch torque sufficient to move the vehicle without applying the accelerator applier after the brake applier has been released. The calculated clutch torque is a function of the actual engine torque value, the engine inertia, and the engine acceleration.

20 Claims, 4 Drawing Sheets

SYSTEM AND METHOD FOR CONTROLLING A DRY DUAL CLUTCH TRANSMISSION OF A VEHICLE

TECHNICAL FIELD

This disclosure relates to a method and system for controlling a dry dual clutch transmission of a vehicle.

BACKGROUND

A dual clutch transmission (DCT) employs two friction clutches for shifting among its forward ratios. In operation, the DCT accomplishes such shifts by alternating engagement between the two friction clutches. In a dry DCT (dDCT), liquids, such as cooling and lubrication liquids, do not circulate through the friction clutches.

SUMMARY

The present disclosure relates to a system and method for controlling a dDCT of a vehicle having an engine and an applier to accelerate the engine, such as an accelerator pedal. The presently disclosed method and system can be used to continually adjust a bite point of an input clutch of the dDCT based on a difference between a commanded clutch torque and a calculated clutch torque in order to minimize the time it takes for a vehicle to creep after a brake applier, such as a brake pedal, is released. The term "bite point" means a clutch position where the clutch transmits sufficient torque from the engine to move the vehicle when the brake applier and the accelerator applier are not depressed. The term "creep" means a movement of the vehicle after the brake applier has been released but before the accelerator applier is applied.

The presently disclosed method can be used to control dDCT of a vehicle. The vehicle includes an acceleratable engine configured to provide torque and inertia to the vehicle, and engine control module (ECM), a brake applier, an accelerator applier, the dDCT, and a transmission control module (TCM). The TCM is in communication with the dDCT and the ECM. Further, the TCM has a recorded torque-to-position (TTP) table. The dDCT has first and second input clutches and first and second gear sets selectively connected to the engine via the respective first and second input clutches. In an embodiment, the method includes the following steps: (a) detecting when the brake applier is released; (b) receiving an actual engine torque value from the ECM; (c) determining an inertia and an acceleration of the engine; (d) calculating, via the TCM, a clutch torque for the first input clutch as a function of the actual engine torque value, the inertia, and the acceleration; (e) determining, via the TCM, a commanded clutch torque sufficient to move the vehicle without applying the accelerator applier after the brake applier has been released; (f) comparing, via the TCM, the calculated clutch torque to the commanded clutch torque to determine a calculated clutch torque difference between the calculated clutch torque and the commanded clutch torque; (g) modifying, via the TCM, the recorded TTP table based on the calculated clutch torque difference to determine a modified bite point; and (h) transmitting, via the TCM, a modified clutch bite point signal to the first input clutch to thereby command the first input clutch to move to the modified clutch bite point.

The present disclosure also relates to (dDCT) assemblies for vehicles. As stated above, the vehicle includes a brake applier or functionally like device for hand operation, an accelerator applier or functionally like device for hand operation, a brake applier position sensor configured to detect the position of the brake applier, and an engine with an engine control module (ECM) and configured to provide torque an inertia to the vehicle. In an embodiment, the dDCT assembly includes a first input clutch, a second input clutch, a first gear set selectively connected to the engine via the first input clutch, a second gear set selectively connected to the engine via the second input clutch, and a transmission control module (TCM) in communication with the ECM. The TCM has a recorded torque-to-position (TTP) table and is configured to perform the following functions: (a) receive a brake applier release signal from the brake applier position sensor to detect if the brake applier has been released; (b) receive an actual engine torque value from the ECM; (c) determine an inertia and an acceleration of the engine; (d) determine, via the TCM, a commanded clutch torque sufficient to move the vehicle without applying the accelerator applier after the brake applier has been released; (e) calculate a clutch torque for the first input clutch as a function of the actual engine torque value, the inertia, and the acceleration; (f) compare the calculated clutch torque to a commanded clutch torque provided by the TCM to determine a clutch torque difference between the calculated clutch torque and the commanded clutch torque; (g) modify the recorded TTP table based on the clutch torque difference to determine a modified bite point; and (h) transmit a modified clutch bite point signal to the first input clutch to thereby command the first input clutch to move to the modified clutch bite point.

The present disclosure also relates to vehicles such as cars or trucks. In an embodiment, the vehicle includes an engine and an engine control module (ECM) in communication with the engine. The vehicle further includes a dry dual clutch transmission (dDCT). The dDCT includes first and second input clutches, first and second gear sets selectively connected to the engine via the respective first and second input clutches, and a transmission control module (TCM) in communication with the dDCT and the ECM. The TCM has a recorded torque-to-position (TTP) table. The TCM is configured to perform the following functions: (a) receive an actual engine torque value from the ECM; (b) determine an inertia and an acceleration of the engine; (c) calculate a clutch torque for the first input clutch as a function of the actual engine torque value, the inertia, and the acceleration; (d) determine, via the TCM, a commanded clutch torque sufficient to move the vehicle without applying the accelerator applier after the brake applier has been released; (e) compare the calculated clutch torque to the commanded clutch torque to determine a clutch torque difference between the calculated clutch torque and the commanded clutch torque; (f) modify the recorded TTP table based on the clutch torque difference to determine a modified bite point; and (g) transmit a modified clutch bite point signal to the first input clutch to thereby command the first input clutch to move to the modified clutch bite point.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
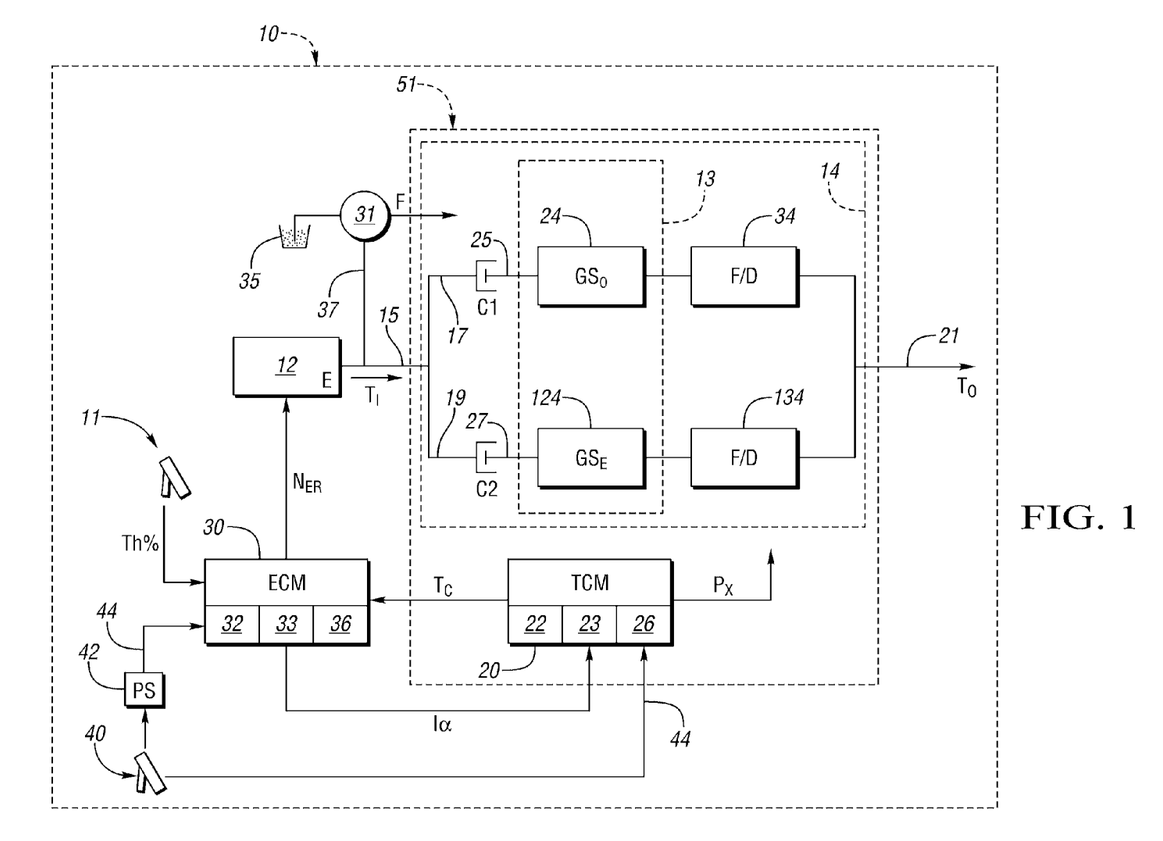
FIG. 1 is a schematic illustration of a vehicle having a dual clutch transmission (DCT) with a clutch position that is controlled during vehicle creeps using a control method as described herein.

Referring to the drawings, wherein like reference numbers refer to like components throughout the several figures, a vehicle 10 is shown schematically in FIG. 1. The vehicle 10 includes an internal combustion engine 12 and a dry dual clutch transmission (dDCT) assembly 51 operatively coupled to the engine (E) 12. The dDCT includes two independently-operated input clutches, i.e., the respective first and second input clutches C1 and C2 and is characterized by an absence of a circulation of cooling or lubricating liquids to the first and second input clutches C1 and C2. The speed of the engine 12 is responsive to a received throttle request (arrow Th %), e.g., a force or a percentage of travel of an accelerator applier 11, such as an accelerator pedal, a hand applier or other suitable device, indicating a relative level of requested engine torque. Such a force/travel may be detected via a sensor (not shown). In response to receipt of the throttle request (arrow Th %), the engine 12 generates input torque (arrow TI) to the dDCT assembly 51 and delivers the input torque (arrow TI) to the dDCT assembly 51 via a rotatable drive member 15.

The vehicle 10 further includes a brake applier 40 and a brake applier position sensor (PS) 42 coupled to the brake applier 40. The brake applier 40 is coupled to the brakes (not shown) of the vehicle 10 and may be a brake pedal, a hand applier, or any other suitable device. During operation of the vehicle 10, an operator may press the brake applier 40 to apply the brakes of the vehicle 10, thereby reducing the speed of the vehicle 10. The brake applier 40 may be released to increase the speed of the vehicle 10. The brake applier position sensor 42 can detect the position of the brake applier 40 and send a brake applier position signal 44 to the ECM 30. The brake applier position signal 44 is indicative of the position of the brake applier 40. In response to the brake applier position signal 44, the ECM 30 may determine or detect whether the brake applier 40 is applied or released. For instance, the brake applier position sensor 42 may send a brake applier position signal 44 in response to a release of the brake applier 40. Thus, the brake applier position sensor 42 can communicate with the ECM 30. Although not shown in the drawings, it is contemplated that the brake applier positions sensor 42 may be in direct electronic communication with the TCM 20. Accordingly, the TCM 20 can receive the brake applier position signal 44 directly from the brake applier position sensor 42. In any case, the TCM 20 can receive the brake applier position signal 44 directly from the brake applier position sensor 42 or indirectly via the ECM 30. Hence, the TCM 20 can detect or determine whether the brake applier 40 is applied or released.

As discussed above, the vehicle 10 includes a DCT assembly 51. In turn, the DCT assembly 51 includes a dDCT 14 and the TCM 20. The dDCT 14 is an automated, manual-like transmission having a gearbox 13 with two independently-operated input clutches, i.e., the respective first and second input clutches C1 and C2 shown in FIG. 1. While omitted from FIG. 1 for illustrative simplicity, each input clutch C1 and C2 may include a center plate containing any number of friction discs, friction plates, or other suitable friction materials. In the dDCT 14, the fluid (arrow F) may be circulated only to the gearbox 13. Instead of the dDCT 14, the vehicle 10 may include a wet DCT. In a wet DCT, fluid (arrow F) may be circulated by an engine-driven fluid pump 31 to the input clutches C1, C2. Hence, instead of the dDCT 14, the vehicle 10 may include a wet DCT or any other suitable transmission. Associated electronic and hydraulic clutch control devices (not shown) ultimately control the shift operation and vehicle launch in response to instructions from various onboard controllers as explained in detail below. In the present disclosure, the TCM 20 may also be referred to as a system for controlling the dDCT assembly 51, the dDCT 14, or both.

In the example dDCT 14 of FIG. 1, within each of the gear sets 24, 124, additional clutches, e.g., hydraulic piston-actuated rotating or braking clutches, may be engaged or disengaged as needed to establish the desired gear state. The reverse gear state may be controlled via the first input clutch C1. Using this type of gear arrangement, the dDCT 14 can be rapidly shifted through its available range of gears without completely interrupting the power flow from the engine 12.

The controllers of the vehicle 10 shown in FIG. 1 include at least a transmission control module (TCM) 20 and an engine control module (ECM) 30. As set forth in detail below with reference to FIGS. 2-4, the TCM 20 works in conjunction with the ECM 30 during creep of the vehicle 10 to thereby institute engine acceleration-based, closed-loop position control over any actuators of the designated input clutch, e.g., clutch pistons. For a dry DCT, the present transmission control approach may help address the fundamental variations to improve creep quality. Although such variation is typically prevalent in a dry DCT due to the lack of cooling at the friction interfaces of the input clutches, a vehicle creep having a wet DCT may also benefit from the present transmission control.

In the example vehicle 10 of FIG. 1, the dDCT 14 also includes an output shaft 21 that is connected to a set of drive wheels (not shown). The output shaft 21 ultimately transmits output torque (arrow TO) to the drive wheels to propel the vehicle 10. The dDCT 14 may include a first shaft 25 connected to the first input clutch C1, a second shaft 27 connected to the second input clutch C2, and respective odd and even gear sets 24, 124 (GSO, GSE) located within the gearbox 13, both of which may be cooled and lubricated via circulation of transmission fluid from a sump 35 via an engine-driven main pump 31, e.g., via a pump shaft 37, or alternatively via an auxiliary pump (not shown).

Within the dDCT 14, the first shaft 25 is connected to and drives only the odd gear sets 24 (GSO). The second shaft 27 is connected to and drives only the even gear sets 124 (GSE), including a reverse gear set. The dDCT 14 further includes upper and lower main shafts 17 and 19, respectively, which are connected to final drive (F/D) gear sets 34, 134. The final drive gear sets 34 and 134 in turn are connected to the output shaft 21 of the dDCT 14 and are configured to provide any required final gear reduction.

With reference to the controllers of the vehicle 10, the TCM 20 and the ECM 30 may be configured as a microprocessor-based devices having elements such as processors 22, 32, tangible, non-transitory memory 23, 33 including but not necessarily limited to read only memory (ROM), random access memory (RAM), electrically-erasable programmable read-only memory (EEPROM), flash memory, etc., and circuitry including but not limited to a high-speed clock, analog-to-digital (A/D) circuitry, digital-to-analog (D/A) circuitry, a digital signal processor or DSP, transceivers 26, 36, and the necessary input/output (I/O) devices and other signal conditioning and/or buffer circuitry.

Figure 4:
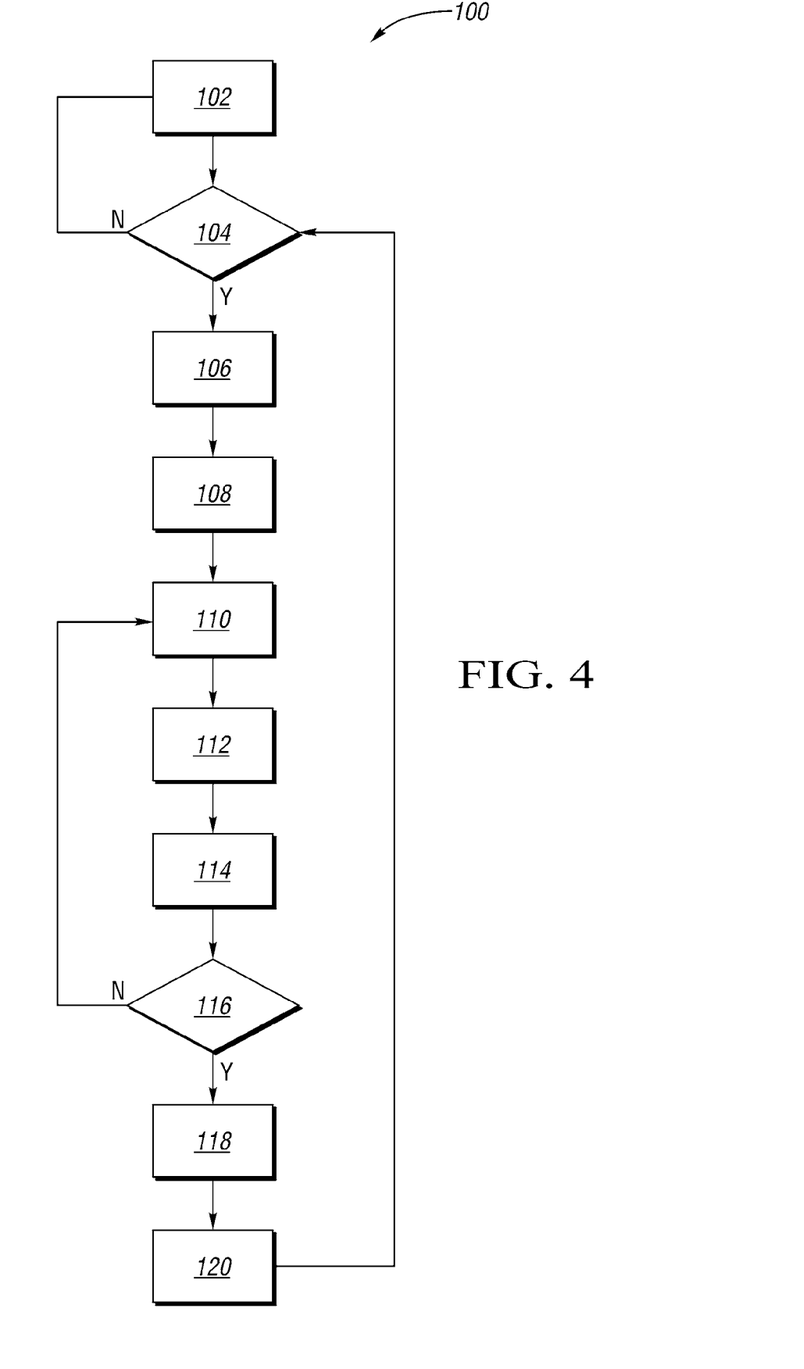
FIG. 4 is a flow chart describing an embodiment of a vehicle creep control method for the vehicle shown in FIG. 1, or any other vehicle having a dDCT as part of its powertrain.

The TCM 20 and ECM 30 are programmed to execute the required steps of the transmission control method 100, an example of which is shown in FIG. 4, with the TCM 20 in particular providing proportional, integral, derivative (PID)-based position control over the operation of a designated input clutch C1 or C2 throughout the duration of a creep of the vehicle 10. As part of the present transmission control method, the ECM 30 may generate various control values, including an engine speed request for control of the engine 12 and an engine inertia torque (arrow I), the latter of which is transmitted to the TCM 20 for use in a calculation by the TCM 20 of what is referred to hereinafter as a calculated clutch torque. Ultimately, the TCM 20 uses the engine inertia torque (arrow I) as a feedback value in maintaining position control over the input clutch C1 or C2, and outputs a position control signal (arrow PX) to the designated input clutch C1 or C2 to thereby control the position of the designated input clutch C1 or C2 in the manner described below.

Figure 2:
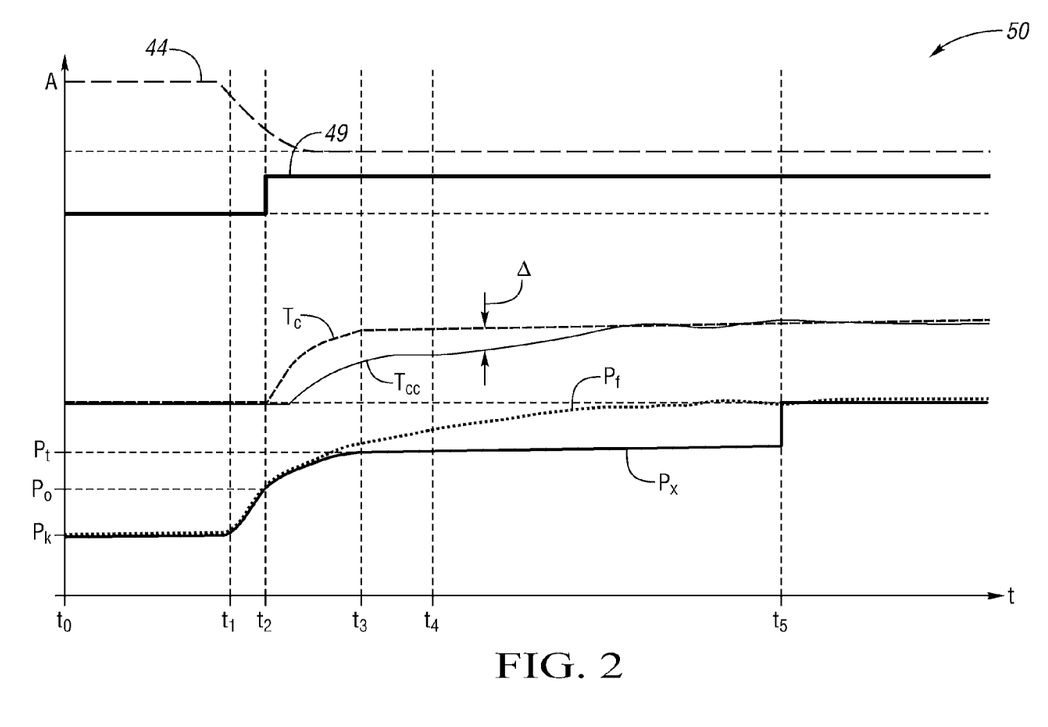
FIG. 2 is a set of time plots describing the changing amplitudes of various vehicle performance values, with time plotted on the horizontal axis and amplitude plotted on the vertical axis.

Referring to FIG. 2, a set of traces 50 is shown to describe various performance characteristics of the vehicle 10 of FIG. 1 during a creep. In each of the traces, signal amplitude (A) is plotted on the vertical axis and time (t) is plotted on the horizontal axis. At time t0, the driver is depressing the brake applier 40, and the TCM 20 can send a base clutch command signal to the designed input clutch (e.g., the first input clutch C1 or second input clutch C2). Specifically, at time t0, when the brake applier 40 is at least partially depressed, the TCM 20 sends a kiss point position signal to the designated input clutch C1 or C2 to thereby command the designed input clutch C1 or C2 to be at its kiss point position Pk. At the kiss point position Pk, the designated input clutch C1 or C2 begins to transmit torque from the engine 12. Thus, the kiss point position Pk is defined as the clutch position where the designated input clutch C1 or C2 begins to transmit torque from the engine 12.

At or near time t1, the driver releases the brake applier 40 and the brake applier position sensor 42 sends the brake applier position signal 44 to the ECM 30, indicating that the brake applier 40 has been released. At time t2, the creep mode of the transmission dDCT 14 is activated. To do so, the TCM 20 can send a creep mode activation signal (trace 49) to the dDCT 14. In the creep mode, the dDCT 14 allows the vehicle 10 to move. In FIG. 2, the creep mode signal (trace 49) is represented as a step signal.

Another of the traces 50 shown in FIG. 2 is the commanded clutch torque (trace Tc), which rises quickly at the beginning of a vehicle creep, and then begins to settle at about time t4 as the TCM 20 makes necessary adjustments. The commanded clutch torque (trace Tc), which may be provided as a calibration value from the TCM 20, e.g., extracted from a lookup table or a torque model recorded in memory 23, may vary from the engine torque. In an embodiment, the commanded clutch torque (trace Tc) may be equal to an output engine torque. As used herein, the "command clutch torque" refers to the clutch torque necessary to creep the vehicle 10 after the brake applier 40 has been released but before the accelerator applier 11 has been applied.

FIG. 2 also illustrates a calculated clutch torque (Tcc), which may be the sum of actual engine torque and the product of engine inertia (I) and the acceleration (a) of the engine 12. The calculated clutch torque difference (Δ) between the commanded clutch torque (trace Tc) and the calculated command clutch torque (trace Tcc) is used by the TCM 20 to determine precisely when to increase or decrease a clutch position signal, and by how much, with the base clutch position signal as trace Px and the modified clutch position signal as trace Pf. In other words, the TCM 20 monitors engine reported torque and the engine inertia torque (I) to determine how much load is acting on the input clutch C1 or C2 of the dDCT 14 during the vehicle creep, and then adjusts the position signal (trace Px) as needed over time.

With continued reference to FIG. 2, the base clutch position signal (trace Px) is generated by the TCM 20 of FIG. 1 and transmitted to the input clutch C1 or C2 of FIG. 1 that is being used to control vehicle creep. As used herein, an "increased" clutch position signal is any position signal or command which results in movement of a clutch apply piston or other actuator in an apply direction of the input clutch C1 or C2, and thus is a signal that results in an increase in clutch torque. Likewise, a "decreased" clutch position signal results in movement of a clutch apply piston or other actuator in the release direction, and thus is a signal that results in reduced clutch torque. The designed input clutch C1 or C2 reaches its base bite point Pt at about time t3. As used herein, the bite point refers to a clutch position wherein the clutch transmits sufficient torque to move the vehicle 10 when the brake applier 40 and the accelerator applier 11 are not pressed. In other words, the bite point is a clutch position wherein the clutch transmits sufficient torque to move the vehicle 10 when the brake applier 40 is not applied and the engine 12 is operating at engine idle speeds. The base bite point Pt may be obtained from a recorded torque to position (TTP) table 60 shown in FIG. 4.

In an example control action in which a calculated clutch torque (trace Tcc) is greater than the commanded clutch torque (trace Tc) from the TCM 20, the clutch position signal (trace Px) may be modified upwardly at time t5 to form trace Pf (i.e., the modified clutch position signal). Adjustment of the base clutch position signal (trace Px) may result in the automatic modification of a recorded torque to position (TTP) table 60, an example of which is shown in FIG. 3.

Figure 3:
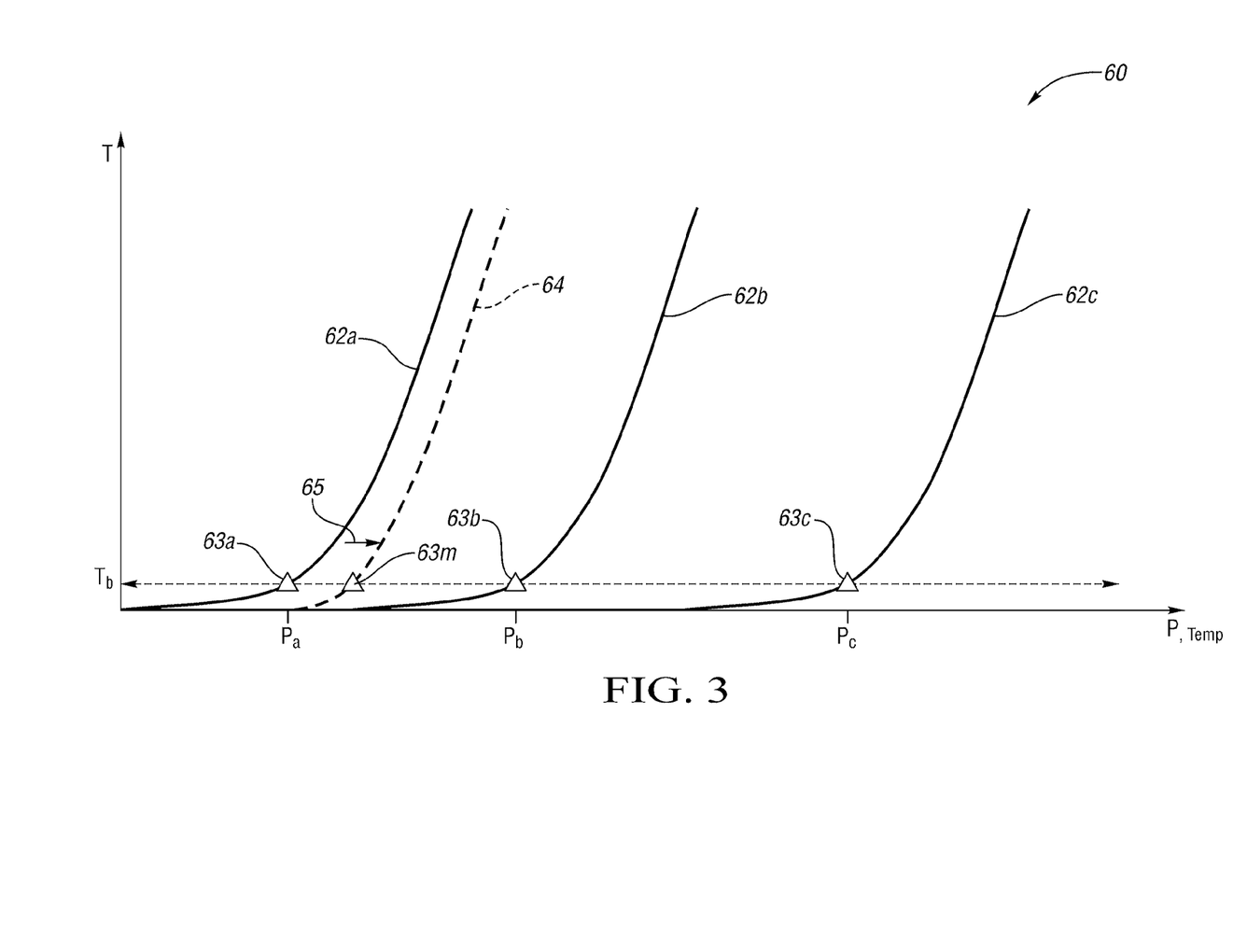
FIG. 3 is an example torque-to-position model usable with the vehicle of FIG. 1, with commanded clutch torque plotted on the vertical axis and clutch position and clutch temperature plotted on the horizontal axis.

With reference to FIG. 3, a TTP model recorded in memory 23 of the TCM 20 (FIG. 1) is used by the TCM 20 to determine precisely how much torque (T) to command for a given clutch position (P), and vice versa. The TTP table 60 may include one or more TTP traces 62a, 62b, and 62c for different clutch temperatures regions (Temp). Each TTP trace 62a, 62b, and 62c includes respective calibrated bite points 63a, 63b, 63c. The calibrated bite point points 63a, 63b, 63c may correspond to a single calibrated bite point torque Tb and to respective bite point clutch positions Pa, Pb, or Pc in each TTP trace 62a, 62b, 63c. Thus, as part of a possible control action, the TCM 20 may modify or adapt the TTP table 60 over time, e.g., in any direction, such as the direction of arrow 65, to form an adapted TTP trace 64, which can be recorded for use in the next creep event. As used herein, the term "creep event" means a movement of the vehicle 10 after the brake applier 40 has been released but before the accelerator applier 11 is applied. Hence, the term "next creep event" refers to a creep event that occurs after another creep event.

Referring to FIG. 4, an example method 100 for controlling the dDCT 14 shown in FIG. 1 begins at step 102, wherein the ECM 30 of FIG. 1 receives a brake applier position signal 44 indicating that a driver of the vehicle 10 has depressed the brake applier 40 with sufficient force to stop the vehicle 10. In step 102, the TCM 20 sends a kiss point position signal to the designed input clutch (e.g., the first input clutch C1 or second input clutch C2) in order to command the designed input clutch C1 or C1 to move to the kiss point position Pk (FIG. 2). As discussed above, the kiss point position Pk is the clutch position where the designated input clutch C1 or C2 begins to transmit torque.

The method 100 proceeds to step 104 where the ECM 30 or TCM 20 determines or detects if the brake applier 40 has been released. In doing so, the ECM 30 or TCM 20 receives a brake applier position signal 44 from the brake applier position sensor 42 in response to a release of the brake applier 40 and thereby detects a brake applier release. If the brake applier 40 has not been released, then the method 100 returns to step 102.

If the TCM 20 or ECM 30 detects that the brake applier 40 has been released (i.e., is not pressed), the method 100 continues to step 106. At step 106, the TCM 20 sends an offset clutch position signal to the designated input clutch C1 or C2 in order to rapidly increase its clutch position until the designed input C1 or C2 reaches an offset clutch position Po (see time t2 in FIG. 2) to minimize creep delay. The offset clutch position Po may be a base bite point (Pt) minus a calibration offset value. The designated input clutch may be the first input clutch C1 or second input clutch C2. Thus, in step 106, the TCM 20 may transmit the offset clutch position signal to the first input clutch C1 or the second input clutch C2.

Once the designated input clutch C1 or C2 reaches the offset clutch position Po, the method 100 continues to step 108. At step 108, the transmission creep mode is activated. To do so, the TCM 20 sends a creep mode signal 49 to the dDCT 14. In the creep mode, the dDCT 14 allows the vehicle 10 to move at engine idle speeds.

Subsequently, the method 100 continues to step 110. Step 110 entails calculating a clutch torque (Tcc), in this example via the sum of actual engine torque and the product of engine inertia (I) and the acceleration ($\alpha$) of the engine 12. The inertia (I) may be a calibrated value that is recorded in memory 23 of the TCM 20. The acceleration ($\alpha$) may be determined using any suitable approach, e.g., by calculation of the rate of change of a measured engine speed signal or by direct measurement. The actual engine torque may be determined from a torque model recorded in memory 33 of the ECM 30 in a particular embodiment. Thus, for any given speed point, the torque being output by the engine 12 is known and reported to the TCM 20, such as over a controller area network (CAN) bus. The calculated clutch torque (Tcc) is recorded, and the method 100 proceeds to step 112.

At step 112, the commanded clutch torque (trace Tc) is determined for a desired output creep torque. The base clutch torque (trace Tc) may be a calibrated value that is record in memory 23 of the TCM 20. The method 100 then proceeds to step 114. In other words, step 112 entails determining, via the TCM 20, the commanded clutch torque (trace Tc) sufficient to move the vehicle 10 without applying the accelerator applier 11 after the brake applier 40 has been released, wherein the commanded clutch torque (trace Tc) is a calibrated value that is recorded in memory 23 of the TCM 20.

At step 114, the TCM 20 compares the commanded clutch torque (trace Tc) to the calculated command clutch torque (trace Tcc). Specifically, the TCM 20 determines the difference between the commanded clutch torque (trace Tc) and the calculated command clutch torque (trace Tcc) to determine the calculated clutch torque difference $\Delta$ shown in FIG. 2. The method 100 then continues to step 116.

At step 116, the TCM 20 determines if the calculated clutch torque difference $\Delta$ is equal to or less than a calibrated difference value. The calibrated difference value may be obtained from the TCM 20 and may be about zero. If the calculated difference is not equal to or less than the calibrated difference value, no adjustment to the base clutch position signal (trace Px of FIG. 2) is required, and the method 100 repeats step 110. Steps 110-116 may continue in a loop until an exit condition signals a shift to steady-state control, typically indicating the completion of the creep. The exit conditions may include reapplying the brake applier 40, the dDCT 14 transitions into slip, launch, or abuse control, among others. If the calculated clutch torque difference $\Delta$ is equal to or less than a calibrated difference value, the method 100 proceeds to step 118.

Step 118 entails adapting or modifying the TTP table 60 of FIG. 3 based on the calculated clutch torque difference $\Delta$. Thus, the amount of adjustment of the TTP table 60 may be proportional to the calculated clutch torque difference $\Delta$. Moreover, the amount of adjustment may be limited by dead bands or other suitable limits to avoid over-adjustment of the TTP model. For example, the clutch position may be increase no more than 0.5 mm in each control loop in one possible approach. The modified TTP table 60 is recorded in the TCM 20. The modified, recorded TTP table 60 now contains a modified, clutch bite point 63m (FIG. 3) that corresponds to the bite point torque Tb at a specific clutch temperature. The method 100 then proceeds to step 120.

At step 120, the TCM 20 transmits a modified, clutch bite point signal to the designated input clutch C1 or C2 to thereby command the designated input clutch C1 or C2 to move to the modified clutch bite point, which is extracted from the modified, recorded TTP table 60. In other words, the TCM 20 adjusts the base clutch position signal (trace Px of FIG. 2) upwardly, thereby increasing the clutch position signal (now trace Pf) by a calibrated amount such that sufficient transmission output torque is applied to creep the vehicle 10. Creeps refers to a movement of the vehicle 10 when the when the brake applier 40 and the accelerator applier 11 are not pressed. The adjustment amount of the base clutch position signal (trace Px) may be proportional to the calculated clutch torque difference $\Delta$. The method 100 returns to step 104 after adjusting the position signal (trace Px of FIG. 3). The method 100 may be performed without using torque sensors.

Using the method 100 set forth hereinabove, the TCM 20 of FIG. 1 can employ the reported engine torque, transmission torque load, and closed loop position control to detect the clutch bite point. At the clutch bite point, the engine and the clutch provide sufficient output torque to the driveline to creep the vehicle 10. The bite point can be adapted and use with other parameters to control vehicle launch and shifting events.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for controlling a dry dual clutch transmission (dDCT) of a vehicle, the vehicle including an acceleratable engine configured to provide torque and inertia, and an engine control module (ECM), an applyable and releasable brake applier, an accelerator applier, the dDCT, and a transmission control module (TCM) in communication with the dDCT and the ECM, the dDCT having first and second input clutches and first and second gear sets selectively connected to the engine via the respective first and second input clutches, the TCM having a recorded torque-to-position (TTP) table, the method comprising:
   detecting when the brake applier is released;
   receiving an actual engine torque value from the ECM;
   determining an inertia and an acceleration of the engine;

calculating, via the TCM, a clutch torque for the first input clutch as a function of the actual engine torque value, the inertia, and the acceleration;

determining, via the TCM, a commanded clutch torque sufficient to move the vehicle without applying the accelerator applier after the brake applier has been released;

comparing, via the TCM, the calculated clutch torque to the commanded clutch torque to determine a calculated clutch torque difference between the calculated clutch torque and the commanded clutch torque;

modifying, via the TCM, the recorded TTP table based on the calculated clutch torque difference to determine a modified bite point; and transmitting, via the TCM, a modified clutch bite point signal to the first input clutch to thereby command the first input clutch to move to the modified clutch bite point.

2. The method of claim 1, further comprising transmitting, via the TCM, a kiss point position signal to the first input clutch to thereby command the first input clutch to move to a kiss point position, which is extracted from the recorded TTP table, when the brake applier is applied, wherein the kiss point position is a clutch position where the first input clutch begins to transmit torque from the engine.

3. The method of claim 1, further comprising transmitting, via the TCM, an offset clutch command signal to the first input clutch to thereby command the first input clutch to move to an offset clutch position, wherein the offset clutch position is equal to a base clutch bite point minus a calibration offset value, wherein the base clutch bite point is a position of the first input clutch where the clutch transmits sufficient torque from the engine to move the vehicle when the brake applier and the accelerator applier are not depressed.

4. The method of claim 3, further comprising transmitting, via the TCM, a creep mode activation signal to the dDCT to activate a creep mode when the first input clutch is at the offset clutch position, wherein, in the creep mode, the dDCT allows the vehicle to move.

5. The method of claim 1, wherein the vehicle includes a brake applier position sensor coupled to the brake applier, and wherein detecting when the brake applier is released includes receiving, via the TCM, a brake applier position signal from the brake applier position sensor in response to a release of the brake applier.

6. The method of claim 1, wherein the dDCT is characterized by an absence of a circulation of liquid to the first and second input clutches.

7. The method of claim 1, further comprising calculating an engine inertia torque, via the ECM, as the product of a calibrated inertia value of the engine and a calculated acceleration of the engine.

8. The method of claim 1, wherein the method is performed without using torque sensors.

9. The method of claim 1, wherein the TTP table includes a plurality of clutch torque to clutch position relationships across different clutch temperatures.

10. A dry dual clutch transmission (dDCT) assembly for a vehicle including a brake applier, an accelerator applier, a brake applier position sensor configured to detect the position of the brake applier, and an engine with an engine control module (ECM), the dDCT assembly comprising:
    a first input clutch;
    a second input clutch;
    a first gear set selectively connected to the engine via the first input clutch;
    a second gear set selectively connected to the engine via the second input clutch;
    a transmission control module (TCM) in communication with the ECM, wherein the TCM has a recorded torque-to-position (TTP) table and is configured to:
        receive a brake applier release signal from the brake applier position sensor to detect if the brake applier has been released;
        receive an actual engine torque value from the ECM;
        determine an inertia and an acceleration of the engine;
        determine, via the TCM, a commanded clutch torque sufficient to move the vehicle without applying the accelerator pedal after the brake applier has been released;
        calculate a clutch torque for the first input clutch as a function of the actual engine torque value, the inertia, and the acceleration;
        compare the calculated clutch torque to the commanded clutch torque provided by the TCM to determine a clutch torque difference between the calculated clutch torque and the commanded clutch torque;
        modify the recorded TTP table based on the clutch torque difference to determine a modified bite point; and
        transmit a modified clutch bite point signal to the first input clutch to thereby command the first input clutch to move to the modified clutch bite point.

11. The dDCT assembly of claim 10, wherein the TCM is configured to transmit a clutch kiss point position signal to the first input clutch to thereby command the first input clutch to move to a clutch kiss point position extracted from the recorded TTP table when the brake applier is applied, wherein the kiss point position is a clutch position where the first input clutch begins to transmit torque from the engine.

12. The dDCT assembly of claim 10, wherein the TCM is configured to transmit an offset clutch command signal to the first input clutch to thereby command the first input clutch to move to an offset clutch position, wherein the offset clutch position is equal to a base clutch bite point minus a calibration offset value, wherein the base clutch bite point is a position of the first input clutch where the clutch transmits sufficient torque from the engine to move the vehicle when the brake applier and the accelerator applier are not depressed.

13. The dDCT assembly of claim 12, wherein the TCM is configured to transmit a creep mode activation signal to the dDCT to activate a creep mode when the first input clutch is at the offset clutch position, wherein, in the creep mode, the dDCT allows the vehicle to move.

14. The dDCT assembly of claim 10, wherein the dDCT assembly is characterized by an absence of a circulation of liquid to the first and second input clutches.

15. A vehicle comprising:
    an engine;
    an engine control module (ECM) in communication with the engine; and
    a dry dual clutch transmission (dDCT) having first and second input clutches, first and second gear sets selectively connected to the engine via the respective first and second input clutches, and a transmission control module (TCM) in communication with the dDCT and the ECM, the TCM having a recorded torque-to-position (TTP) table;
    wherein the TCM is configured to:
        receive an actual engine torque value from the ECM;
        determine an inertia and an acceleration of the engine;

calculate a clutch torque for the first input clutch as a function of the actual engine torque value, the inertia, and the acceleration;

determine, via the TCM, a commanded clutch torque sufficient to move the vehicle without applying an accelerator applier after a brake applier has been released;

compare the calculated clutch torque to the commanded clutch torque to determine a clutch torque difference between the calculated clutch torque and the commanded clutch torque;

modify the recorded TTP table based on the clutch torque difference to determine a modified bite point; and transmit a modified clutch bite point signal to the first input clutch to thereby command the first input clutch to move to the modified clutch bite point.

16. The vehicle of claim 15, wherein the TCM is configured to transmit a clutch kiss point position signal to the first input clutch to thereby command a clutch kiss point position extracted from the recorded TTP table when the brake applier is applied, wherein the kiss point position is a clutch position where the first input clutch begins to transmit torque from the engine.

17. The vehicle of claim 15, wherein the TCM is configured to transmit an offset clutch command signal to the first input clutch to thereby command the first input clutch to move to an offset clutch position, wherein the offset clutch position is equal to a base clutch bite point minus a calibration offset value.

18. The vehicle of claim 17, wherein the TCM is configured to transmit a creep mode activation signal to the dDCT to activate a creep mode when the first input clutch is at the offset clutch position, wherein, in the creep mode, the dDCT allows the vehicle to move.

19. The vehicle of claim 15, wherein the dDCT is characterized by an absence of a circulation of liquid to the first and second input clutches.

20. The vehicle of claim 15, wherein the ECM is configured to calculate an engine inertia torque as the product of a calibrated inertia value of the engine and a calculated acceleration of the engine.

* * * * *